United States Patent [19]
Fujiyoshi

[11] Patent Number: 5,748,310
[45] Date of Patent: May 5, 1998

[54] OPTICAL SPECTRUM SEPARATION APPARATUS

[75] Inventor: Kenichi Fujiyoshi, Tokyo, Japan

[73] Assignee: Ando Electric Co., Ltd., Tokyo, Japan

[21] Appl. No.: 791,512

[22] Filed: Jan. 30, 1997

[30] Foreign Application Priority Data

Jan. 31, 1996 [JP] Japan ................... 8-016041

[51] Int. Cl.$^6$ .................. G01J 3/06; G01J 3/18
[52] U.S. Cl. ............................... 356/334; 356/328
[58] Field of Search ........................ 356/305, 326, 356/328, 331, 332, 333, 334

[56] References Cited

FOREIGN PATENT DOCUMENTS

| | | | |
|---|---|---|---|
| 3403372 | 7/1985 | Germany | 356/326 |
| 269758 | 7/1989 | Germany | 356/326 |
| 2-159528 | 6/1990 | Japan . | |
| 2-206734 | 8/1990 | Japan . | |
| 6-11391 | 1/1994 | Japan . | |
| 6-221922 | 8/1994 | Japan . | |

Primary Examiner—F. I. Evans
Attorney, Agent, or Firm—Finnegan, Henderson, Farabow, Garrett & Dunner, L.L.P.

[57] ABSTRACT

A high-precision spectrum separation apparatus enables to generate an output beam having a specific wavelength from a multi-wavelength input beam. The input beam is focused on a diffraction grating through a focusing lens to generate a number of diffracted component beams, of which a diffracted component beam having a specific wavelength is directed to an output slit, resulting in an output beam having well-defined spectral properties. When the output beam is required to have a band of wavelengths, the fixed focal distance of the focusing lens is shorter than is required to generate well-defined output beam, resulting that the diffracted component beam cannot be focused precisely on the output slit. In such a case, a flat glass plate is introduced between the focusing lens and the output slit to adjust the focal-point of the focusing lens so that the diffracted component beams are focused precisely on the output slit. An output beam having well-defined spectral properties is thus produced from the apparatus.

7 Claims, 7 Drawing Sheets

5,748,310

1

OPTICAL SPECTRUM SEPARATION APPARATUS

BACKGROUND OF THE INVENTION

1. Field of the Invention

The present invention relates to an optical spectrum separation apparatus which selects and outputs a beam of light having a particular wavelength from an input beam having a plurality of wavelength components.

2. Description Of The Related Art

FIG. 6 is a schematic drawing of a conventional spectrum separation apparatus comprising a light source 1, having an (optical) output section 1a, for generating a beam of light composed of a plurality of wavelength components. An optical fiber 2 has one terminal end 2a (hereinbelow referred to as an input terminal 2a) which is optically coupled to the output section 1a of the light source 1. A beam from the output section 1a of the light source 1 is introduced into the input terminal 2a, propagated through the optical fiber 2 and is output from the other terminal end 2b (hereinbelow referred to as an output terminal 2b) of the optical fiber 2. The output terminal 2b can function either as an input slit for the spectrum separation apparatus or an opening for the output beam.

The spectral separation apparatus includes a focusing lens 3 which focuses a beam output from the optical fiber 2. The beam passing through the focusing lens 3 is focused on an optical diffraction grating 4. There are numerous grooves formed on the surface of the diffraction grating 4 for diffracting component beams (having various wavelengths) contained in the focused beam generated by the focusing lens 3 into different directions, depending on the wavelength. The diffraction grating 4 is mounted so as to enable the grating 4 to be rotated about an axis parallel to the grooves. The apparatus is provided with an output slit 6 through which a diffracted component beam having a specific wavelength is separated and output. Of the plurality of diffracted component beams generated by the diffraction grating 4, only that component beam diffracted in a particular direction is again focused by the focusing lens 3 and directed to the output slit 6. The spectral resolution capability of the spectrum separation apparatus is determined by the output slit 6.

The apparatus functions as follows. The multi-wavelength beam output from the output section 1a of the light source 1 is directed to the input terminal 2a of the optical fiber 2, propagated through the fiber 2 and is output from the output terminal 2b. The multi-wavelength beam is focused by the focusing lens 3 and is directed to the diffraction grating 4. Because the diffraction grating 4 is mounted so that it may rotate about a pivot axis (which is parallel to the grooves of the grating 4), it is possible to diffracted a component beam having a specific wavelength in a specific direction to the focusing lens 3, by adjusting the rotation angle about the pivot axis. The component beam diffracted in the specific direction is intercepted by the focusing lens 3 to focus it on the output slit 6 which allows only that wavelength component which lies within the range of the slit width to transmit.

The conventional spectrum separation apparatus presents a problem that the quality of the component beam generated from the apparatus is not as precise as required by modern technology. The reason is as follows. Although the focal distance is a function of the wavelength of the specific component beam passing through the focusing lens 3, the focusing arrangement of the lens 3 is fixed. This leads to a

2 problem illustrated in FIG. 7. When the diffracted component beam from the diffraction grating 4 has a wavelength 11, the focal distance of the focusing lens 3 matches with the fixed distance between the lens 3 and the output slit 6, and the selected output beam is focused on the output slit 6. However, when the selected component beam has a wavelength 12, the focal distance of the focusing lens 3 for this particular wavelength is shorter than the fixed distance between the lens 3 and the output slit 6 such that the diffracted component beam is focused in front of the output slit 6. The result is inferior quality of the output beam such that the intensity of the output beam from the output slit 6 is degraded, leading to general deterioration in the spectral resolution capability of the apparatus. Therefore, the unresolved problem in the conventional spectrum separation apparatus causes inferior wavelength definition of the selected output beam.

SUMMARY OF THE INVENTION

The object of the present invention is to provide a spectrum separation apparatus which can accurately separate a desired component beam having a specific wavelength from an original beam of light containing a plurality of components, regardless of the wavelength of a selected component beam.

The object has been achieved in a optical spectrum separation apparatus having an input section for introducing an input beam for spectrum separation; an optical diffraction means for diffracting the input beam into component beams; a focusing section for focusing a component beam onto an optical output means for generating an output beam having a specific wavelength, wherein a focal-point adjusting means for adjusting a focal distance of the focusing section in correspondence with the specific wavelength is introduced in an optical path of the component beam between the focusing section and the optical output means so as to generate the output beam having the specific wavelength.

The present apparatus further provides that even when the original input beam contains a band of wavelengths having shorter focal distance than the fixed focal distance of the focusing system, precise focusing on the output slit is possible by letting the diffracted component beam to pass through a flat glass plate before reaching the output slit to provide a focal-point adjustment. Thus, it become possible to suppress the wavelength-dependency of the focusing device so that component beams having any wavelengths may be precisely focused on the output slit to generate output beam of well-defined spectral properties.

DESCRIPTION OF THE PREFERRED EMBODIMENTS

Preferred embodiments will be explained below with reference to the drawings.

A. First Embodiment

Figure 1:
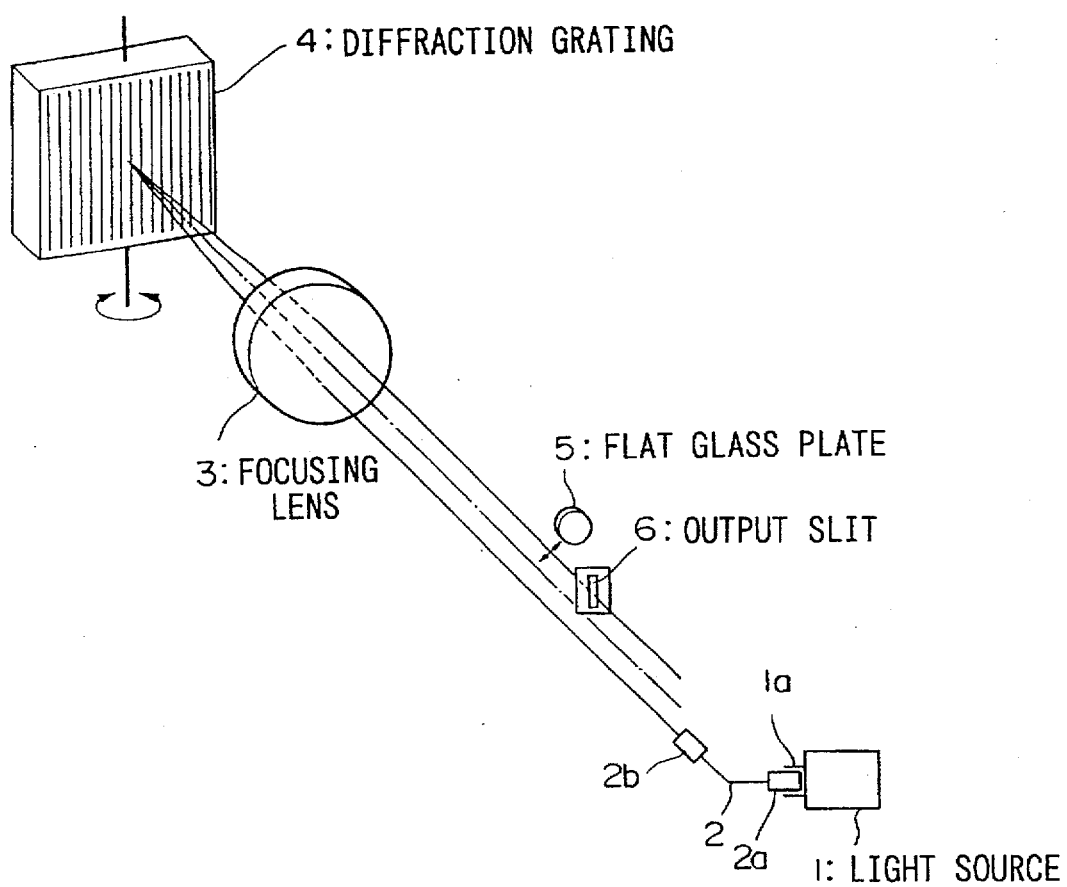
FIG. 1 is a schematic drawing of a first embodiment of the spectrum apparatus of the present invention.
Figure 6:
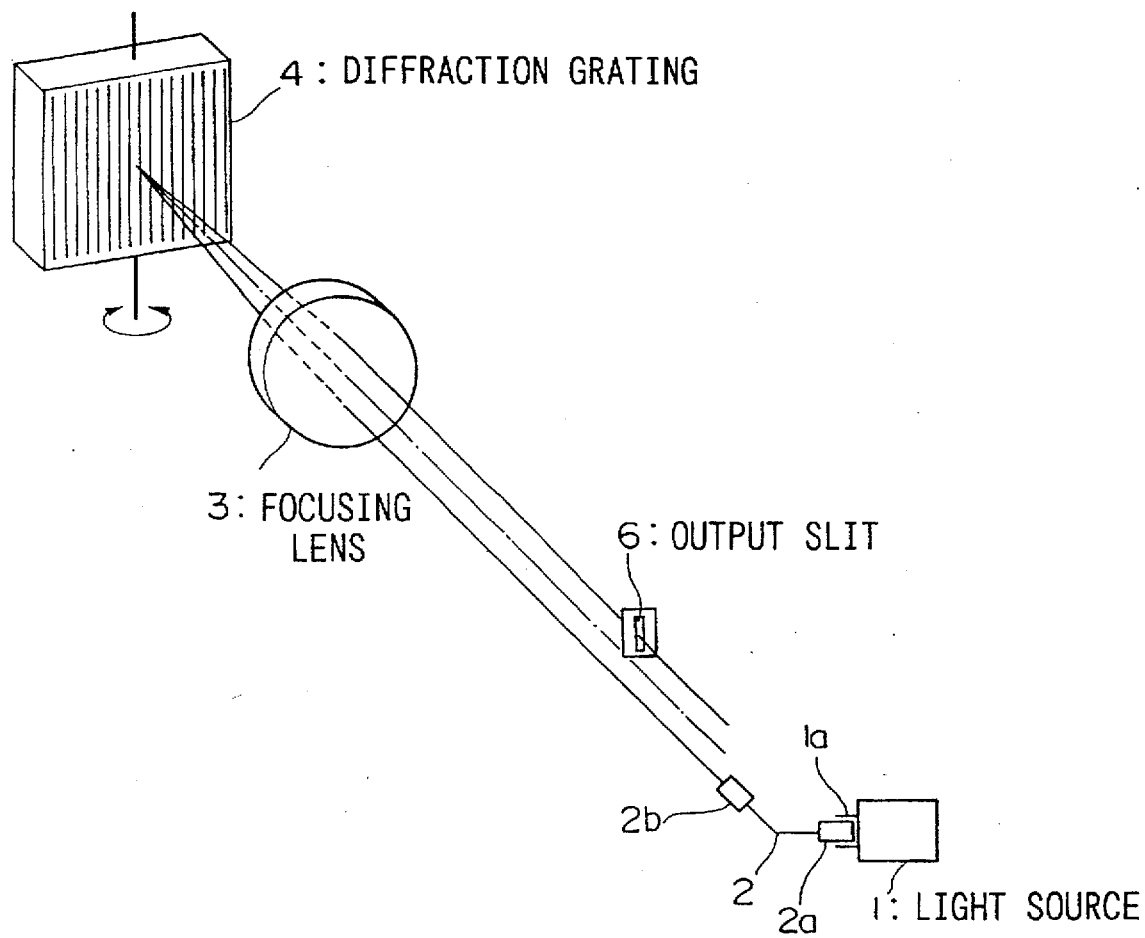
FIG. 6 is a schematic drawing of a conventional spectrum separation apparatus.
Figure 7:
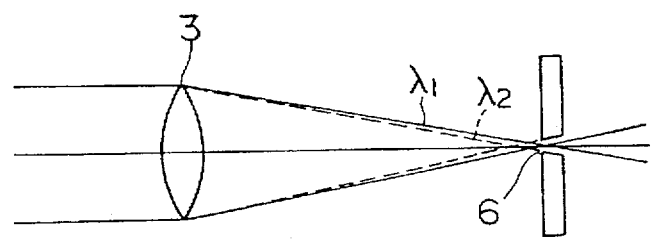
FIG. 7 is a drawing to show the optical path between the focusing lens 3 and the output slit 6 in the conventional spectrum separation apparatus.

FIG. 1 is a schematic drawing of the first embodiment. In FIG. 1, those parts of the apparatus which are the same as those in the conventional apparatus shown in FIG. 6 will be designated by the same reference numerals and their explanations will be omitted. The difference between the first embodiment apparatus shown in FIG. 1 and the conventional apparatus shown in FIG. 6 is that there is a flat glass plate 5 for compensating the focal-point of a component beam. The flat glass plate 5 is inserted in the optical path of a diffracted component beam between the lens 3 and in front of the output slit 6 when the specific wavelength of the component beam to be output from the output slit 6 falls within a given range, and when the specific wavelength falls outside the range, the plate 5 can be removed from the optical path. When the flat glass plate 5 is to be placed in the optical path, it is positioned so that the center of the plate 5 coincides with the center of the component beam.

The operation of the apparatus will be explained in the following. The beam from the output section 1a of the light source 1 is directed to the input terminal 2a of the optical fiber 2, is propagated through the fiber 2 and is output from the output terminal 2b. The output beam from the output terminal 2b is focused on the diffraction grating 4 by the focusing lens 3.

The multi-wavelength beam of light focused on the diffraction grating 4 generates a plurality of component beams of different wavelengths at respective diffraction angles, thereby producing a plurality of component beams having a plurality of corresponding wavelengths. The rotation angle of the diffraction grating 4 is adjusted automatically to obtained a diffracted component beam of a desired wavelength to be directed to the focusing lens 3 and reach the output slit 6. The rotation angles for the diffraction grating 4 are pre-determined for each wavelength to be output from the output slit 6, and the apparatus automatically chooses a rotation angle for the diffraction grating 4 to correspond with the wavelength selected by a user of the apparatus, and the diffraction grating 4 is rotated according to the rotation angle chosen to match the desired wavelength.

Of the number of diffracted component beams generated by the diffraction grating 4, the desired component beam directed towards the focusing lens 3 is focused on the output slit 6 by the focusing lens 3. However, the focal points are in fact different, depending on the value of the wavelengths, therefore, for some diffracted component beam, the beam does not focus on the output slit 6. Therefore, for those wavelengths having focal distance less than the distance between the focusing lens 3 and the output slit 6, the flat glass plate 5 is placed in front of the output slit 6. By so doing, the focal distance of the focusing lens 3 is extended, and the diffracted component beam from the diffraction grating 4 is able to focus on the output slit 6. For wavelengths other than the one discussed above, the flat glass plate 5 is not placed between the focusing lens 3 and the output slit 6.

Figure 2:
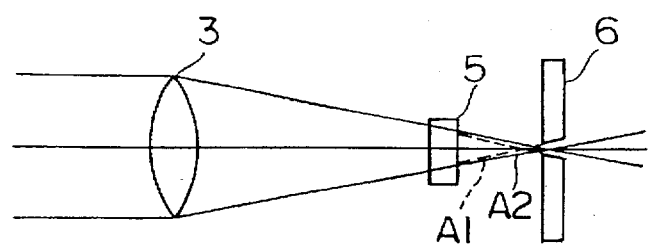
FIG. 2 is a drawing to show the optical path between the focusing lens 3 and the output slit 6 in the first embodiment.

FIG. 2 illustrates a portion of the relevant optical path of the optical system presented in FIG. 1. Optical path A1 relates to the case of having no flat glass plate 5 in the optical path. Optical path A2 relates to the case of having the flat glass plate 5 placed in front of the output slit 6. As illustrated in this drawing, for those diffracted component beams in a certain wavelength band, the focal distances of the focusing lens 3 is shorter (than is required), and diffracted component beam follows along the optical path A1, and the beam is focused at some spot in front of the output slit 6. Therefore, for those diffracted component beams in such a wavelength band, the flat glass plate 5 is placed in their optical paths so as to extend the focal distance of the focusing lens 3 and propagate the beams along the path A2. By so doing, the focal distance of the lens 3 is in effect corrected so that the diffracted component beams are focused on the output slit 6.

Thus, in this embodiment, the differences in the focal distance to the output slit 6 become almost non-existent for diffracted component beams in any wavelength band, and the problem of indeterminate focusing is essentially eliminated.

B. Second Embodiment

Figure 3:
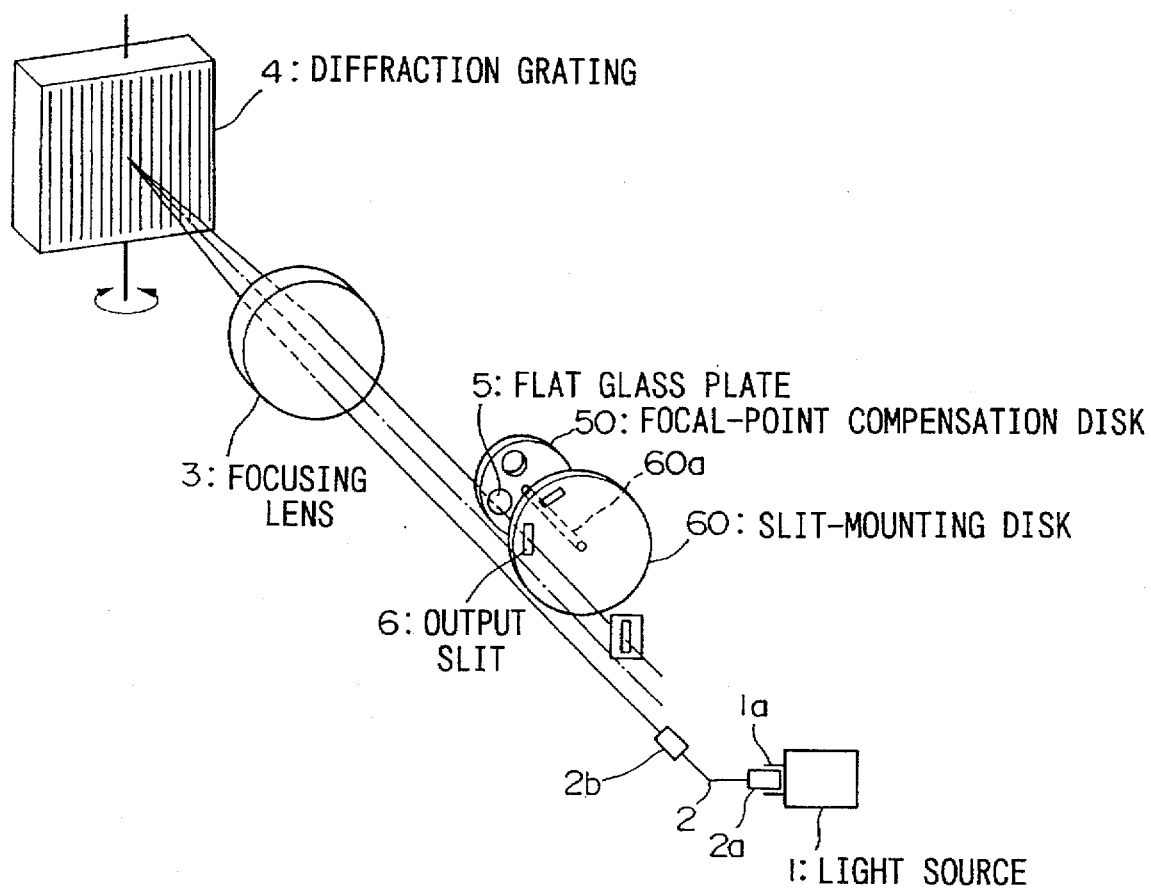
FIG. 3 is a schematic drawing of a second embodiment of the spectrum separation apparatus of the present invention.

FIG. 3 is schematic drawing of a second embodiment of the spectrum separation apparatus according to the present invention. In this drawing, those parts which are common to those shown in FIG. 1 are designated by the same reference numerals, and their explanations are omitted. In this embodiment also, a flat glass plate 5 is placed in front of the output slit 6, but the apparatus differs in the following respect.

(a) Construction of the Output Slit 6

A slit-mounting disc 60 is provided for the apparatus, and the center of disc 60 is fixed on a rotation axis 60a, which freely rotatably supports the slit-mounting disc 60. Around the circumference of some suitable radius from the center of the slit-mounting disc 60, a series of output slits 6 are mounted thereon for obtaining diffracted component beams having a desired wavelength. Also, the slit-mounting disc 60 is placed at a focal point of the focusing lens 3, and by rotating the slit-mounting disc 60 about the rotation axis 60a, each of the slit discs 60 is brought into the paths of the diffracted component beams focused by the focusing lens 3. Each of the output slits 6 is prepared for the various wavelength bands for the desired output beam to be separated and outputted, and therefore, a proper width dimension is provided to obtain an output beam having the desired wavelength.

As in the first embodiment, the rotation angle of the diffraction grating 4 is chosen to correspond with the desired wavelength, but in the second embodiment, there is an additional adjustment of the rotation angle of the slit-mounting disc 60 which is carried out in association with the rotation angle for the diffraction grating 4, and an appropriate output slit 6 corresponding to the desired wavelength is selected and placed at the focal point of the wavelength for the diffracted component beam passing through the focusing lens 3.

(b) Construction of the Flat Glass Plate 5

A focal-point compensation disc 50 is utilized, which is placed after the focusing lens 3 and in front of the slit disc 60, and the center of the focal-point compensation disc 50 is fixed on the rotation axis 60a. Therefore, the focal-point compensation disc 50 rotates along with the rotation motion of the slit-mounting disc 60. On the focal-point compensation disc 50, there is a series of holes disposed along a circumference of some radius from the center. These holes are for guiding the diffracted component beams from the focusing lens 3 to the output slits 6. As explained in the first embodiment, the focal distance for some wavelength bands is shorter than the fixed focal-distance of the focusing lens 3 (i.e. the distance between the lens 3 and the output slit 6), and focusing occurs in front of the output slit 6 unless some corrective measures are taken to compensate for the focal-point of the lens 3. Therefore, those output slits 6 assigned to function in such wavelength bands are suitably paired with appropriate flat glass plates 5 on the focal-point compensation disc 50 so that the output slits 6 may function properly.

The apparatus operates as follows. The rotation angle of the slit-holding disc 60 is adjusted to suit the desired wavelength of the output beam. An appropriate output slit 6 is positioned in the optical path of the diffracted component beam output from the focusing lens 3. The focal-point compensation disc 50 rotates along with rotation of the slit-mounting disc 60. For a diffracted component beam having a specific wavelength, the focal distance of the lens 3 is incorrect, however, for those output slits 6 on the slit-mounting disc 60 which are designated for certain wavelength bands, appropriate flat glass plates 5 are always provided therewith. Therefore, when an output slit 6 designated for one of those wavelength bands is placed in the optical path of the diffracted component beams, the diffracted beam must always pass through a flat glass plate 5 thus providing an effective focal distance correction so that a diffracted component beam may correctly focus on the output slit 6. When the focal distance of a diffracted component beam is the same as the distance between the focusing lens 3 and the output lens 6, there is no need for compensation, and the diffracted component beam is allowed to transmit through an open hole provided on the focal-point compensation disc 50 focusing correctly on the output slit 6. It follows that for any wavelength bands, an output beam having a correct desired wavelength can be obtained from the output slit 6.

C. Third Embodiment

Figure 4:
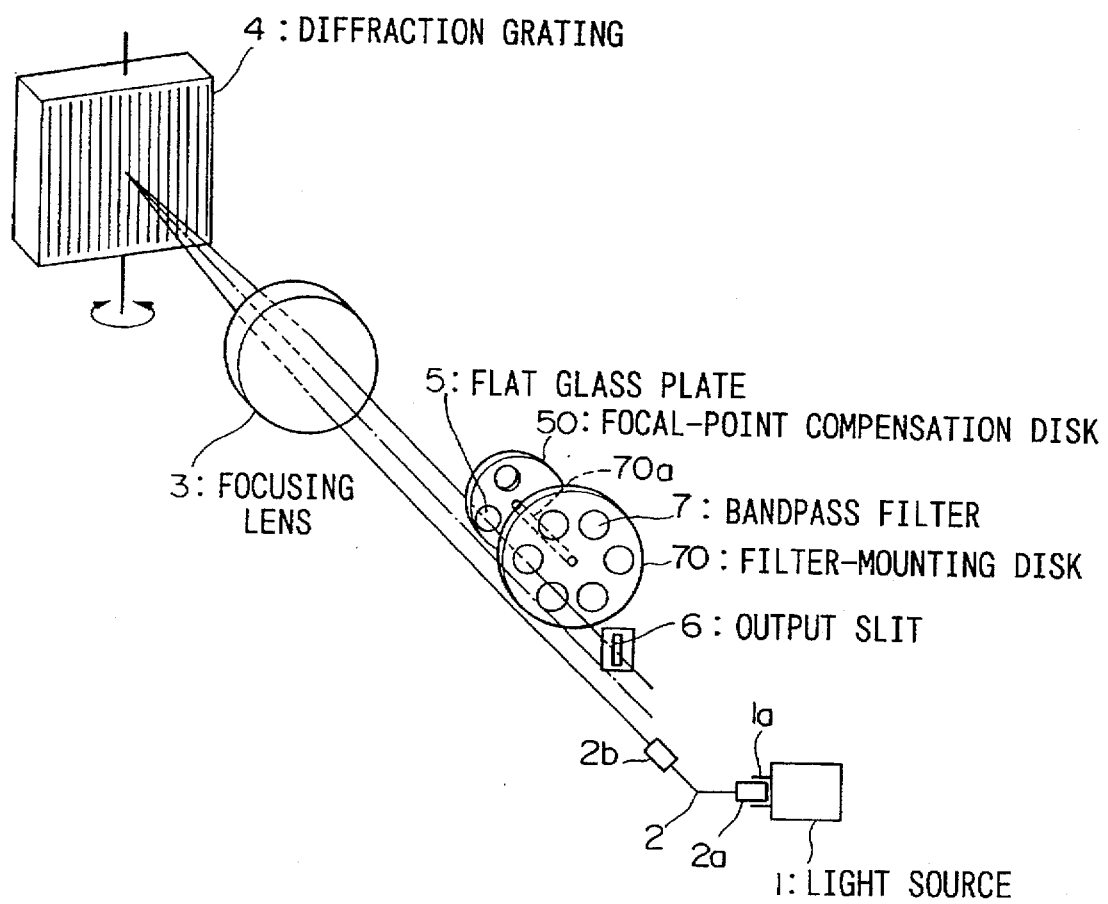
FIG. 4 is a schematic drawing of a third embodiment of the spectrum separation apparatus of the present invention.

FIG. 4 is a schematic illustration of a third embodiment of the spectrum separation apparatus of the present invention. Those parts of the apparatus which are the same as those in the first embodiment are designated by the same reference numerals, and their explanations are omitted. The third embodiment apparatus differs from the first embodiment apparatus in the following respects.

(a) Bandpass filter 7

In this embodiment, a filter-mounting disc 70 is placed aft of the focusing lens 3 and fore of the output slit 6 with respect to the propagation direction of the diffracted component beam. The center of the filter-mounting disc 70 is fixed to a rotation axis 70a so that the disc 70 can be freely rotated about the axis 70a. Around the circumference of some radius away from the center, there is disposed a series of bandpass filters 7, each of which transmits only a certain band of wavelengths. When the disc 70 is rotated about the axis 70a, each of the filters 7 is successively brought into the optical paths of the diffracted component beams propagating towards the output slit 6 from the lens 3.

As in the first embodiment apparatus, the rotation angle of the diffraction grating 4 is adjusted to obtain a desired wavelength of the diffracted component beam, but additionally, the rotation angle of the filter-mounting disc 70 is adjusted simultaneously to correspond with the angle of diffraction grating 4 so that a bandpass filter 7 to allow transmission of the desired wavelength is positioned in the optical path of the diffracted component beam from the focusing lens 3.

(b) Construction Related to the Flat Glass Plate 5

The focal-point compensation disc 50 is positioned aft of the focusing lens 3 and fore of the filter-mounting disc 70 with respect to the propagation direction of the diffracted component beam, and the center of the disc 50 is fixed to the axis 70a. Therefore, the focal-point compensation disc 50 rotates with the rotation motion of the filter-mounting disc 70. The focal-point compensation disc 50 also is provided with a series of circumferential holes distanced away at some radius from the center thereof. These holes are for guiding the diffracted component beams from the focusing lens 3 to the bandpass filter 7. As explained in the first embodiment, the focal distance of some wavelength bands is shorter than the given focal distance of the lens 3, and the diffracted component beam is focused in front of the output slit 6 unless some corrective measures are taken. Therefore, for the bandpass filter 7 corresponding to such wavelength bands, the focal-point compensation disc 50 disposed in the front thereof is suitably fitted with a number of flat glass plates 5.

The apparatus is operated by adjusting the rotation angle of the filter-mounting disc 70 to correspond with the desired wavelength band so as to position a suitable bandpass filter 7 in the optical path of the diffracted component beam output from the focusing lens 3. The focal-point compensation disc 50 is rotated along with the rotation motion of the filter-mounting disc 70. For those wavelengths of shorter focal point, an appropriate flat glass plates 5 is always provided for each of the bandpass filters 7 on the filter-mounting disc 70. Therefore, when a bandpass filter 7 designated for one of those wavelength bands is placed in the optical path of the diffracted component beams, the diffracted component beam must pass through a flat glass plate 5 thus providing an effective focal distance correction and the diffracted component beam is focused correctly on the output slit 6. When the focal distance of a diffracted component beam is the same as the distance between the focusing lens 3 and the output lens 6, there is no need for focal distance compensation, and the diffracted component beam is allowed to transmit through an unfilled hole (without the plate 5) provided on the focal-point compensation disc 50 and the component beam is focused correctly on the output slit 6. It follows that for any bands of wavelength of the diffracted component beams, an output beam having a correct desired wavelength can be produced from the output slit 6 of the apparatus.

D. Fourth Embodiment

Figure 5:
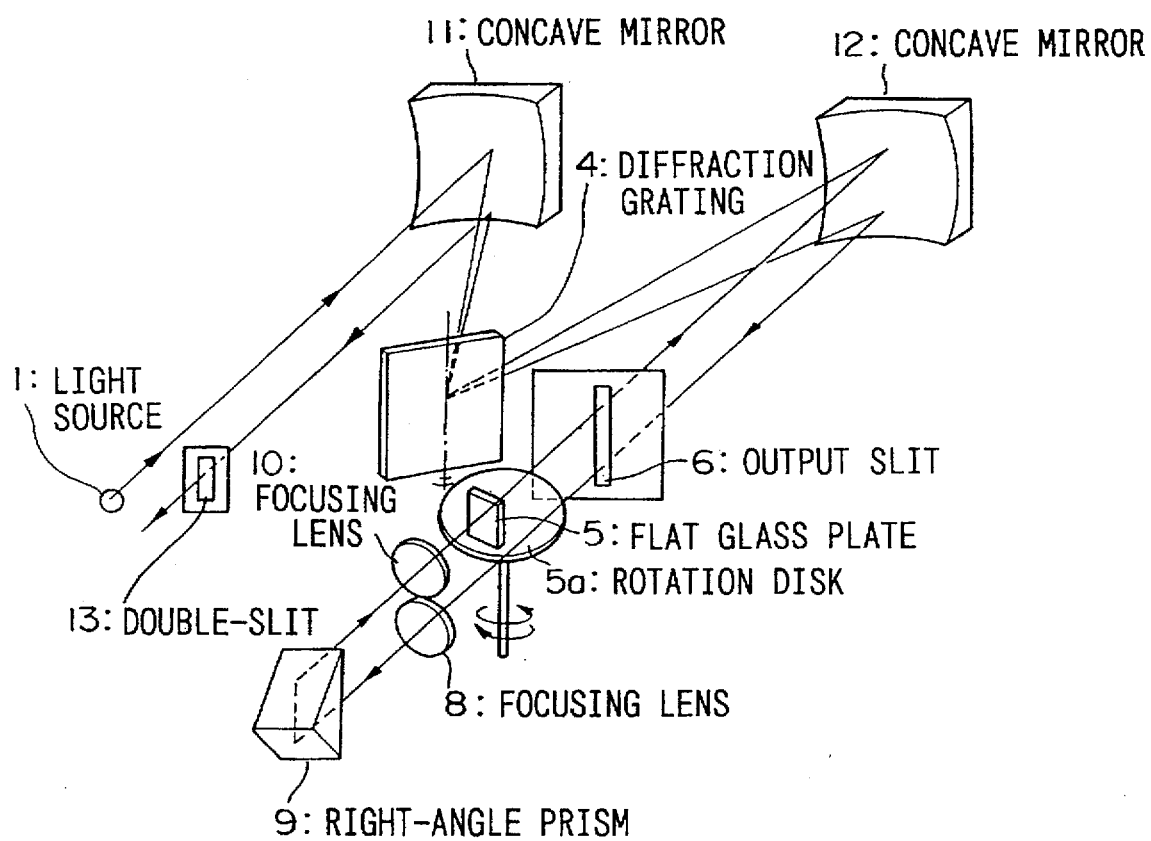
FIG. 5 is a schematic drawing of a fourth embodiment of the spectrum separation apparatus of the present invention.

FIG. 5 is a schematic illustration of a fourth embodiment of the spectrum separation apparatus of the present invention. In the optical systems presented in the foregoing embodiments, the focusing lens 3 was utilized in the focusing section as the device for focusing the diffracted component beams from the diffraction grating. However, the Czerny-Turner type spectrum separators using a concave mirror in the focusing section, do not present the problem of fixed wavelength associated with focusing lens because a concave mirror is not affected by such a limitation. The fourth embodiment apparatus is a Zanier-Turner type spectrum separator which is provided with concave mirrors 11, 12 in place of the focusing lens 3 used in the first embodiment. The apparatus depends on some optical lens systems, however, and an arrangement similar to that in the first embodiment is required. In the following, the operation of the apparatus will be explained.

FIG. 5 shows that an original beam of light input into the separator apparatus is directed to a first concave mirror 11 to generate a parallel beam. The parallel beam is input into the diffraction grating 4 which generates diffracted component beams at different angles depending on the wavelength of the component beam. Of the various diffracted component beams, those component beams having specific wavelengths to diffract in the direction of a second concave mirror 12, will be reflected by the concave mirror 12. Of the reflected component beams reflected from the concave mirror 12, only those component beams having a wavelength governed by two optical factors: first, the distance between the diffraction grating 4 and the concave mirror 12 and second, the opening area of the concave mirror 12, will pass through the output slit 6. The outgoing beam which passes through the output slit 6 is focused by a first focusing lens 8 on a right-angle prism 9, and the focused beam is returned by reflecting back from the right-angle prism 9. The returning beam from the right-angle prism 9 is focused by a second focusing lens 10 once again on the output slit 6. However, as explained earlier, various reflected component beams passing through the focusing lens 10 focus on different locations depending on their wavelengths, and some wavelengths will not be focused on the output slit 6. Therefore, for those wavelength bands having focal distances shorter than the distance between the second focusing lens 10 and the output slit 6, a rotation disc 5a will be operated so that a suitable flat glass plate 5 having an appropriate correction factor will be brought into position between the lens 10 and the output slit 6. The focal distance of the second focusing lens 10 is thus extended, and focusing is achieved on the output slit 6. The output beam from the output slit 6 returns through the same optical route as before to be focused by the first concave mirror 11, and is focused on a final double-slit 13 to generate the final output beam from the apparatus.

What is claimed is:

1. An optical spectrum separation apparatus having an input section for introducing an input beam for spectrum separation; an optical diffraction means for diffracting said input beam into component beams; a focusing section for focusing a component beam onto an optical output means for generating an output beam having a specific wavelength, wherein a focal-point adjusting means for adjusting a focal distance of said focusing section in correspondence with said specific wavelength is introduced in an optical path of said component beam between said focusing section and said optical output means so as to generate said output beam having said specific wavelength.

2. An optical spectrum separation apparatus as claimed in claim 1, wherein said diffraction means is a diffraction grating.

3. An optical spectrum separation apparatus as claimed in claim 1, wherein said focusing section includes a focusing lens.

4. An optical spectrum separation apparatus as claimed in claim 1, wherein said optical output means is a slit having a specific width dimension to correspond with a specific wavelength.

5. An optical spectrum separation apparatus as claimed in claim 1, wherein said focal-point adjusting means is a flat glass plate.

6. An optical spectrum separation apparatus, having an input section for introducing an input beam for spectrum separation; a diffraction grating for diffracting said input beam into component beams; a focusing section for focusing a diffracted component beam onto an output slit for generating an output beam having a specific wavelength, comprising:

a slit-mounting disc having a plurality of output slits, disposed circumferentially about a center of said slit-mounting disc, to correspond with wavelength bands for a plurality of component beams, wherein said slit-mounting disc is mounted on a rotation axis so that said plurality of output slits may be rotated to traverse an optical path of a focused diffracted component beam output from said focusing section; and a focal-point compensation disc, disposed aft of said focusing section and fore of said slit-mounting disc, operating in association with said slit-mounting disc so that a flat glass plate for adjusting a focal distance of said focusing section may be positioned in said optical path so as to be paired with an output slit corresponding to a specific wavelength band.

7. An optical spectrum separation apparatus, having an input section for introducing an input beam for spectrum separation; a diffraction grating for diffracting said input beam into component beams; a focusing section for focusing a component beam onto an output slit for generating an output beam having a specific wavelength, comprising:

a filter-mounting disc having a plurality of bandpass filters, disposed circumferentially about a center of said filter-mounting disc, for allowing transmission of component beams having respective wavelength bands, wherein said filter-mounting disc is mounted on a rotation axis so that said plurality of bandpass filters may be rotated to traverse an optical path of a focused diffracted component beam output from said focusing section; and a focal-point compensation disc, disposed aft of said focusing section and fore of said filter-mounting disc, operating in association with said filter-mounting disc so that a flat glass plate for adjusting a focal distance of said focusing section may be positioned in said optical path so as to be paired with a bandpass filter corresponding to a specific wavelength band.

* * * * *